United States Patent
Guillemaut et al.

(10) Patent No.: US 9,902,501 B2
(45) Date of Patent: Feb. 27, 2018

(54) PROPELLER FOR AN AIRCRAFT TURBOMACHINE, INCLUDING A BLADE RETAINING STRUCTURE THROUGH WHICH THE AERODYNAMIC PART OF EACH BLADE PASSES

(71) Applicant: Airbus Operations (SAS), Toulouse (FR)

(72) Inventors: Julien Guillemaut, Toulouse (FR); Guillaume Gallant, Lareole (FR)

(73) Assignee: Airbus Operations (SAS), Toulouse (FR)

( * ) Notice: Subject to any disclaimer, the term of this patent is extended or adjusted under 35 U.S.C. 154(b) by 86 days.

(21) Appl. No.: 14/977,049

(22) Filed: Dec. 21, 2015

(65) Prior Publication Data

US 2016/0176532 A1 Jun. 23, 2016

(30) Foreign Application Priority Data

Dec. 22, 2014 (FR) ...................................... 14 63126

(51) Int. Cl.
| | | |
|---|---|---|
| *B64D 27/00* | (2006.01) | |
| *B64D 27/14* | (2006.01) | |
| *B64C 11/00* | (2006.01) | |
| *B64C 11/06* | (2006.01) | |
| *B64C 11/20* | (2006.01) | |

(52) U.S. Cl.
CPC ............ *B64D 27/14* (2013.01); *B64C 11/001* (2013.01); *B64C 11/06* (2013.01); *B64C 11/20* (2013.01); *B64D 2027/005* (2013.01); *Y02T 50/66* (2013.01)

(58) Field of Classification Search
None
See application file for complete search history.

(56) References Cited

U.S. PATENT DOCUMENTS 1,740,095 A * 12/1929 Jervan ....................... F01P 7/06
236/35
1,804,016 A * 5/1931 Koenig ................. B64C 11/001
416/175

(Continued)

FOREIGN PATENT DOCUMENTS

DE 102011117542 5/2013
EP 0244515 11/1987

(Continued)

OTHER PUBLICATIONS

French Search Report, dated Oct. 13, 2015.

*Primary Examiner* — Medhat Badawi
(74) *Attorney, Agent, or Firm* — Greer, Burns & Crain, Ltd.

(57) ABSTRACT

A propeller for a turbomachine intended to be driven in rotation about a propeller rotation axis and including variable pitch blades. The propeller further includes a structure for radial retention of the blades in the event of them breaking. The retaining structure extends around the propeller rotation axis and has the aerodynamic part of each blade of the propeller pass through it. Moreover, each aerodynamic part is equipped with an abutment configured to be retained radially by the retaining structure in the event of a blade fracture causing a fracture in the aerodynamic part radially inside the abutment.

11 Claims, 5 Drawing Sheets

(56) References Cited

U.S. PATENT DOCUMENTS

| | | | | |
|---|---|---|---|---|
| 1,820,467 A * | 8/1931 | Liska | ............... | B64C 11/36 415/129 |
| 1,961,214 A * | 6/1934 | Hall | ............... | B64C 11/001 415/130 |
| 2,030,622 A * | 2/1936 | Ceglowski | ............... | B64C 11/001 417/390 |
| 2,270,615 A * | 1/1942 | Baldwin | ............... | B63H 1/16 416/189 |
| 2,366,795 A * | 1/1945 | Lamorcaux | ............... | B64C 11/001 416/145 |
| 3,729,957 A * | 5/1973 | Petrie | ............... | F01D 5/022 415/122.1 |
| 4,767,270 A * | 8/1988 | Seidel | ............... | B64C 11/001 416/129 |
| 5,112,191 A * | 5/1992 | Strock | ............... | B64C 11/06 416/129 |
| 5,118,256 A * | 6/1992 | Violette | ............... | B64C 11/06 416/134 R |
| 5,380,156 A * | 1/1995 | Iacovino | ............... | F04D 29/662 416/144 |
| 5,415,524 A * | 5/1995 | Gamble | ............... | B63H 1/16 416/145 |
| 5,988,978 A * | 11/1999 | Pearce | ............... | F04D 29/662 416/145 |
| 6,960,063 B2 * | 11/2005 | Reinfeld | ............... | B64C 11/001 416/1 |
| 7,189,061 B2 * | 3/2007 | Hong | ............... | F04D 29/326 29/407.05 |
| 8,845,270 B2 * | 9/2014 | Nordstrom | ............... | B64C 11/02 415/140 |
| 2009/0220344 A1* | 9/2009 | Pfeiffer | ............... | B64C 11/06 416/219 A |
| 2010/0215499 A1* | 8/2010 | Lafont | ............... | B64C 11/06 416/204 A |
| 2011/0056183 A1* | 3/2011 | Sankrithi | ............... | B64C 11/48 60/204 |
| 2012/0020796 A1* | 1/2012 | Carre | ............... | B64C 11/06 416/219 R |
| 2016/0107745 A1* | 4/2016 | Cote | ............... | B64C 11/003 416/87 |
| 2016/0178531 A1* | 6/2016 | Nicq | ............... | B64C 11/26 356/364 |

FOREIGN PATENT DOCUMENTS

| | | |
|---|---|---|
| EP | 2774852 | 9/2014 |
| FR | 499053 | 1/1920 |
| WO | 20100116080 | 10/2010 |

* cited by examiner

PROPELLER FOR AN AIRCRAFT TURBOMACHINE, INCLUDING A BLADE RETAINING STRUCTURE THROUGH WHICH THE AERODYNAMIC PART OF EACH BLADE PASSES

CROSS-REFERENCES TO RELATED APPLICATIONS

This application claims the benefit of the French patent application No. 1463126 filed on Dec. 22, 2014, the entire disclosures of which are incorporated herein by way of reference.

BACKGROUND OF THE INVENTION

The present invention relates to the field of aircraft turbomachine propellers. It more particularly concerns managing the risk of the blades of the propeller breaking, also known as the risk of uncontained engine rotor failure (UERF).

The invention applies to all types of aircraft, commercial and military, including propeller turbomachines such as turboprops for example or turbomachines with two contrarotating propellers known as "open rotor" turbomachines.

There are known from the prior art propeller turbomachines types in which the blades of the propeller are of variable pitch. Such propellers equip conventional turboprops and also turbomachines with two contrarotating propellers known as "open rotor" turbomachines A turbomachine propeller is known from the document WO20100116080, for example.

To meet specific standards, aircraft must provide a solution to the risk of the blades of the propeller breaking. In service, such blade fractures can in effect generate debris liable to damage the adjacent turbomachine and/or to damage the fuselage of the aircraft, for example at the level of a pressurized compartment delimited by that fuselage. To prevent damaging the fuselage, in particular when it delimits a pressurized compartment such as the passenger cabin, the fuselage may be equipped with an anti-debris shield that extends over a large angular sector of the part of the fuselage situated in line with the propeller. This shield represents a penalty in terms of mass and cost, however.

An alternative in the specific case of aircraft equipped with turbomachines attached to the aft part of the fuselage comprises moving the turbomachines aft so that their propellers are no longer situated in line with a pressurized compartment, but aft of a sealed bulkhead delimiting that compartment. However, this solution imposes lengthening the tail cone of the aircraft and therefore also leads to penalties in terms of mass and cost.

There is therefore a need to optimize the design of propeller turbomachines in relation to managing the risk of UERF.

SUMMARY OF THE INVENTION

To address this requirement at least in part, the invention firstly comprises a propeller for a turbomachine intended to be driven in rotation about a propeller rotation axis and including variable pitch blades, each blade comprising a root and an aerodynamic part.

In accordance with the invention, the propeller further includes a structure for radial retention of the blades in the event of them breaking, the retaining structure extending around the propeller rotation axis and having the aerodynamic part of each blade of the propeller pass through it, and each aerodynamic part is equipped with an abutment intended to be retained radially by the retaining structure in the event of a blade fracture causing a fracture in the aerodynamic part radially inside the abutment.

The invention is noteworthy in that, by artfully integrating the blade retaining structure into the propeller, it enables a saving in mass and cost. In effect, if the fracture occurs radially inside the abutment, the blade debris is retained radially by the dedicated structure. If on the other hand the fracture occurs radially outside the abutment, the blade debris is then short and its kinetic energy therefore proves to be relatively uncritical in relation to the UERF risk. In all cases, it is not necessary to integrate a shield into the fuselage in line with the propeller or to elongate the tail cone of the aircraft unnecessarily if the propeller turbomachines are attached at this point. Moreover, the risk of an adjacent turbomachine being damaged by blade debris is eliminated, again by reason of the radial retention of any such debris by the structure specific to the invention.

The invention preferably has at least one of the following optional features, separately or in combination.

The aerodynamic part of each blade is equipped with a connecting plate of circular shape, the axis of which coincides with a pitch axis of the blade, the retaining structure including a plurality of housing orifices each rotatably housing the connecting plate of one of the blades of the propeller.

The connecting plate takes the form of a disk. Other circular forms may nevertheless be envisaged without departing from the scope of the invention, such as a frustoconical shape.

The retaining structure is preferably a structure extending continuously around the propeller rotation axis, i.e., in a closed manner with no discontinuities, and this retaining structure is, for example, produced in the form of a plurality of parts fixed to one another.

The retaining structure is of annular general shape, preferably with an axial half-section having the shape of an aerodynamic profile.

The abutment is arranged facing a radially internal surface of the retaining structure.

The invention also comprises an aircraft portion including a fuselage defining a pressurized compartment, preferably a passenger cabin, and at least one turbomachine attached to the fuselage via an attachment pylon, the turbomachine including at least one propeller as described above arranged in an imaginary transverse plane passing through the pressurized compartment.

The turbomachine preferably includes two contrarotating propellers each arranged in an imaginary transverse plane passing through the pressurized compartment.

The turbomachine is preferably attached to an aft portion of the fuselage by the attachment pylon situated forward or aft of the sealed bulkhead delimiting a passenger compartment of the aircraft.

The turbomachine preferably includes a gas generator driving each propeller, the gas generator having passing through it at least one imaginary transverse plane passing through a portion of the fuselage situated aft of the pressurized compartment.

Finally, the invention comprises an aircraft including such a portion.

Other advantages and features of the invention will become apparent in the following nonlimiting detailed description.

BRIEF DESCRIPTION OF THE DRAWINGS

The invention will be better understood on reading the following detailed description of nonlimiting embodiments thereof and by examining the appended drawings, in which.

DETAILED DESCRIPTION OF THE PREFERRED EMBODIMENTS

Figure 1:
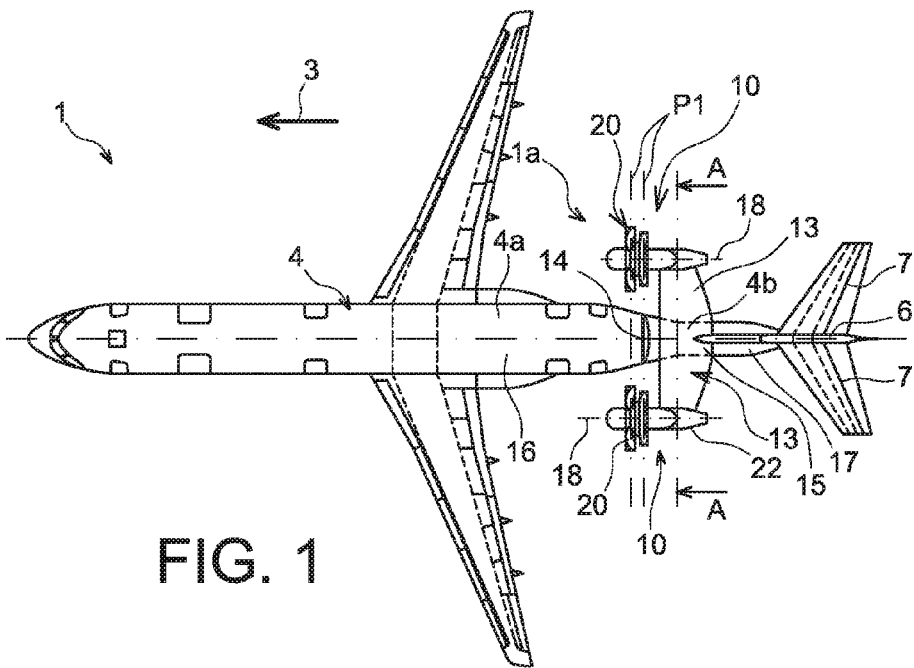
FIG. 1 represents a top view of an aircraft including an aft portion conforming to a preferred embodiment of the invention.
Figure 1A:
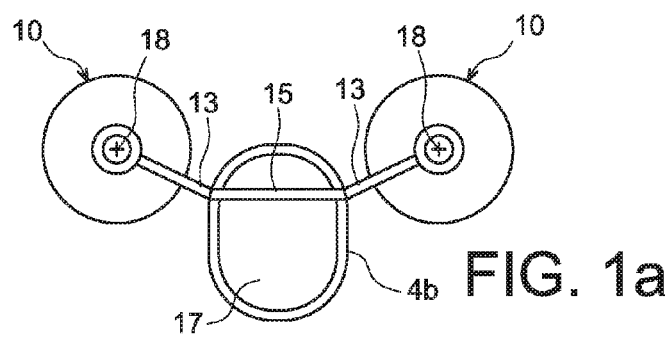
FIG. 1a is a view in section taken along the line A-A in FIG. 1.

Referring to FIGS. 1 and 1a, there is shown an aft portion 1a of a commercial aircraft 1 in accordance with the present invention.

In the classic manner, the aft portion 1a includes a fuselage 4, a vertical tail fin 6 also known as a "vertical stabilizer" and two horizontal tailplanes 7. It also includes a sealed bulkhead 14 for separating, in the longitudinal direction of the aircraft, a pressurized compartment 16 forming a passenger cabin from a non-pressurized aft compartment 17. In this regard, it is noted that in the description the terms "forward" and "aft" are to be considered according to a direction 3 of forward movement of the aircraft resulting from the thrust exerted by the turbomachines The two compartments 16, 17 are obviously delimited by the fuselage 4.

The aft portion 1a is also equipped with two propeller turbomachines 10 attached laterally to the fuselage 4 via conventional attachment pylons 13.

Each of the two turbomachines 10 includes a pair of contrarotating propellers in the manner of turbomachines known as "open rotor" machines However, as emerges clearly hereinafter, here the propellers have the particular feature of each including a radial blade retaining structure that forms a shield through which the blades of the propeller pass. In service, this shield turns with the rest of the propeller about a propeller rotation axis 18.

In this configuration in which the turbomachines 10 are arranged on the aft portion of the fuselage 4, each of the two contrarotating propellers 20 lies in an imaginary transverse plane P1 passing through the pressurized compartment 17 and the portion 4a of the fuselage situated forward of the sealed bulkhead 14. The two propeller planes P1 associated with each turbomachine 10 are therefore arranged transversely, one aft of the other, while remaining forward of the sealed bulkhead 14. This does not generate any problem in relation to the UERF risk, because the blade retaining structure, to be described hereinafter, prevents blade debris from being projected toward the fuselage and toward the other turbomachine 10. This notably makes it possible to shorten the non-pressurized compartment 17, with a notable mass saving aided by the fact that no protecting shield is necessary on the fuselage in and in the vicinity of the planes P1.

Moreover, it is noted that each turbomachine 10 is designed with the so-called "puller" configuration, the particular feature of which resides in the fact that the pair of contrarotating propellers is situated forward of a gas generator 22 of the turbomachine driving the pair of propellers. For its part the gas generator 22 is situated globally aft of the sealed bulkhead 14, since there is at least one imaginary transverse plane A-A passing through the portion 4b of the fuselage situated aft of the sealed bulkhead 14. This portion 4b of the fuselage situated aft of the sealed bulkhead 14 is conventionally referred to as the tail cone of the aircraft.

Figure 1B:
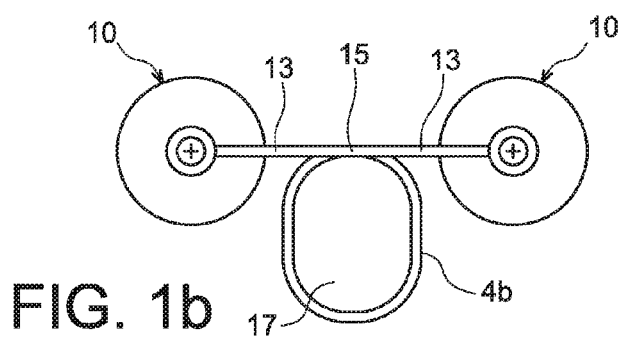
FIG. 1b is a view similar to that of Figure 1a conforming to an alternative embodiment.

In the FIG. 1a configuration, the turbomachines 10 arranged on respective opposite sides of the fuselage 4 are connected to the latter via pylons 13 that are assembled laterally to the same fuselage. A beam 15 connecting these two pylons 13 passes through the non-pressurized compartment 17. In another configuration shown in FIG. 1b, the two turbomachines 10 are mounted at the top of the fuselage 4b via a connecting beam 15 that no longer passes through the compartment 17 and is assembled to this upper portion of the fuselage. Moreover, in this configuration, the beam 15 and the two pylons 13 can be provided by one and the same structure, which is preferably straight.

Figure 2:
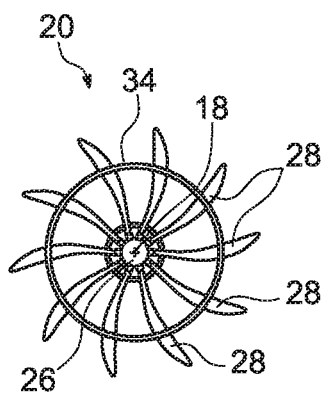
FIG. 2 represents a front view of a turbomachine propeller equipping the aft portion shown in the preceding figures.
Figure 3:
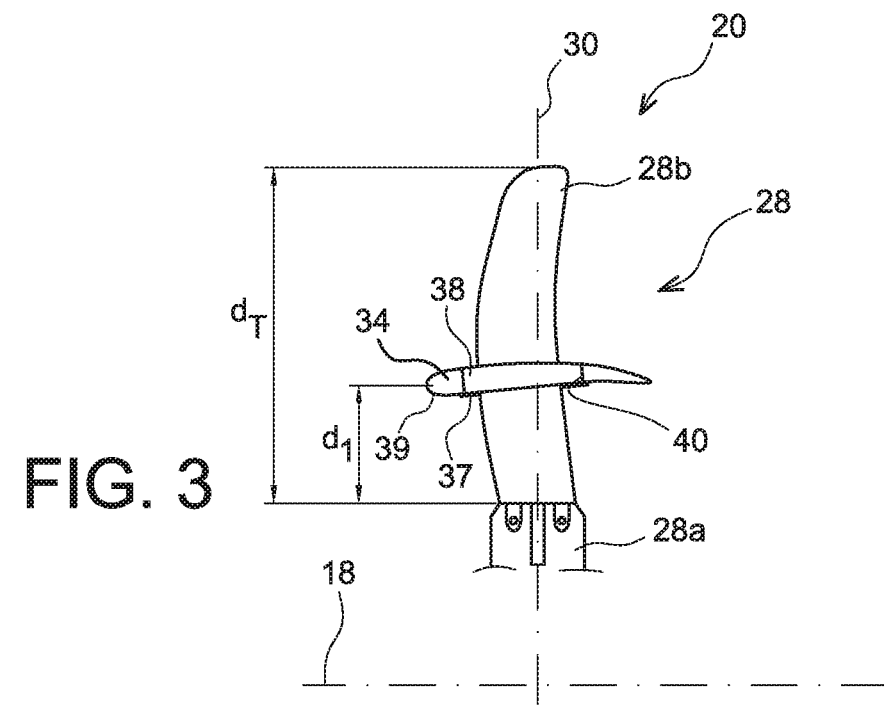
FIG. 3 represents a view in axial half-section of the propeller shown in the preceding figure, conforming to a first preferred embodiment of the invention.
Figure 4:
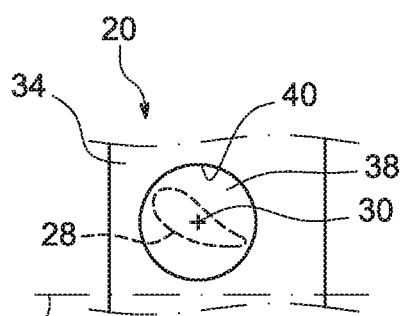
FIG. 4 represents a top view of that of the preceding figure.

Referring now to FIGS. 2 to 4, there is represented one of the propellers 20 in accordance with a first preferred embodiment of the invention. The other propellers of the aforementioned turbomachines are of identical or similar design.

The propeller 20, intended to be rotated about the axis 18, includes a hub 26 from which extend radially a plurality of blades 28 spaced angularly from one another. In the conventional manner, these blades are of variable pitch, i.e., each of them can be pivoted about a pitch axis that is specific to it. This pitch axis is identified by the reference number 30 in FIGS. 3 and 4. The means for controlling the pitch of the blades are conventional and will not be described further. These means generally cooperate with a root 28a of the blade that is housed within the hub of the propeller and from which extends an aerodynamic portion 28b of the blade.

As previously mentioned, one of the particular features of the invention resides in the fact that the propeller further includes a radial blade retaining structure 34 that comes into play in the event of the blades breaking. In other words, this is a closed structure having two surfaces, namely an extrados surface and an intrados surface connected to each other at a leading edge and at a trailing edge.

The retaining structure 34 is globally annular, extending around the propeller rotation axis 18. In axial half-section, the structure 34 has an aerodynamic profile shape, as seen best in FIG. 3.

The aerodynamic portion 28b of each blade 28 passes through the annular structure 34. This preferably occurs at a mean radial distance "d1" from the root 28a that is of the order of 0.4 to 0.7 times the total radial dimension "dt" of the aerodynamic portion 28b.

At this passing level, each blade 28 is equipped with a disk-shaped connecting plate 38 centered on the pitch axis 30. This disk 38 surrounds the aerodynamic blade portion 28b rigidly fastened to this same disk and for example made in one piece with it. The disk is housed so that it can rotate about the axis 30 in a housing orifice 40 of the annular retaining structure 34. This orifice 40, the shape of which is complementary to that of the disk 38, preferably passes through the structure 34.

Moreover, the aerodynamic portion 28b of each blade 28 is equipped with an abutment 37 situated facing a radially internal surface of the retaining structure 34, this surface bearing the reference 39 in FIG. 3 and corresponding to the intrados of the profile. Here the abutment takes the form of a flange 37 extending radially around the aerodynamic portion 28b over a greater radial distance than the disk 38 below which this flange 37 is located. In the normal operating configuration there is only a small radial clearance between the flange 37 and the intrados 39 of the retaining structure 34.

It is noted that to facilitate assembly of the propeller, the annular retaining structure 34 can be segmented axially and/or angularly, the sectors then being fixed to one another by conventional means, for example by welding.

Figure 5:
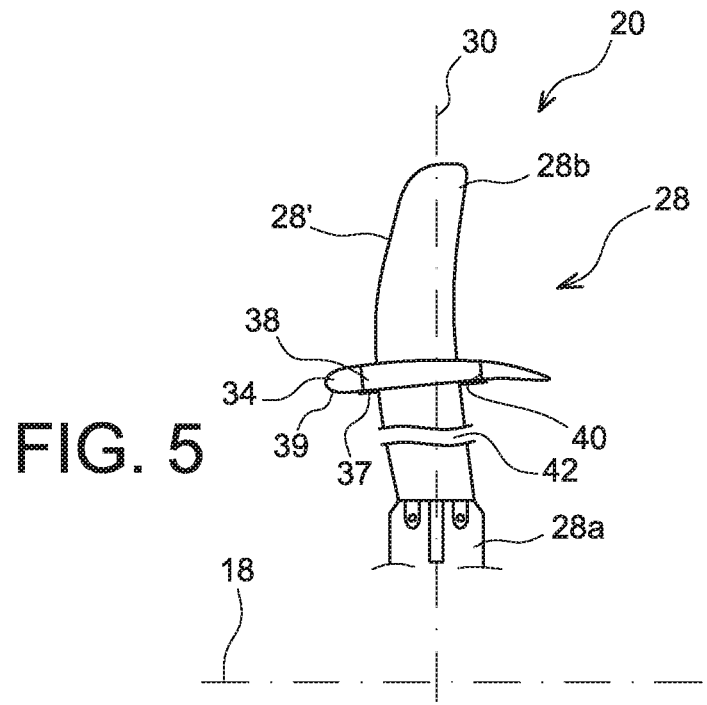
FIG. 5 represents a view analogous to that of FIG. 3 after a blade fracture.

In the event of a blade breaking, as shown diagrammatically in FIG. 5, blade debris 28' is generated radially outside the fracture 42. In the example shown, the fracture 42 is radially inside the flange 37. This debris 28' is advantageously then radially retained by the annular structure 34 by virtue of the flange 37 abutting against the intrados 39 of that structure after the small radial clearance is taken up. This implies that this debris 28' cannot be ejected from the propeller in this radial direction.

In a different situation in which the fracture 42 is located beyond the flange 37, the debris 28' generated is in fact ejected radially but without risk to the surrounding elements by virtue of its small size.

Figure 6:
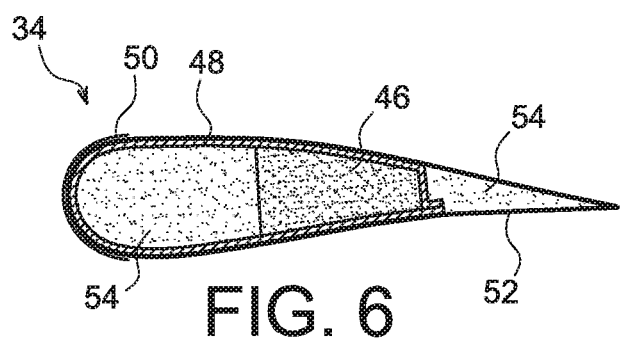
FIG. 6 is a view in axial half-section representing a detailed embodiment of the blade retaining structure equipping the propeller.

By way of illustrative example, FIG. 6 shows the possibility of producing the annular retaining structure 34 with a shape having an aerodynamic profile. There is first provided a core 46 of fibers of high mechanical strength. This core is the part intended to house the disk 38, not represented in FIG. 6. A reinforcing structure 48 extends around the core 46, except at the level of a front longitudinal member thereof In effect, the reinforcing structure 48 extends as far as the leading edge of the profile and is covered at this location by a foil 50 of corrosion-resistant material. A skin 52 surrounds the assembly and is routed all along the profile, the remaining portions of which are filled in with a low-density filling material 54, for example a foam.

Figure 7:
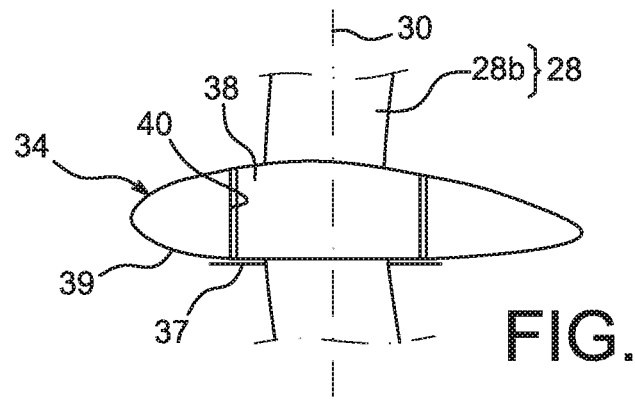
FIG. 7 is a view to a larger scale similar to that of FIG. 3.
Figure 8:
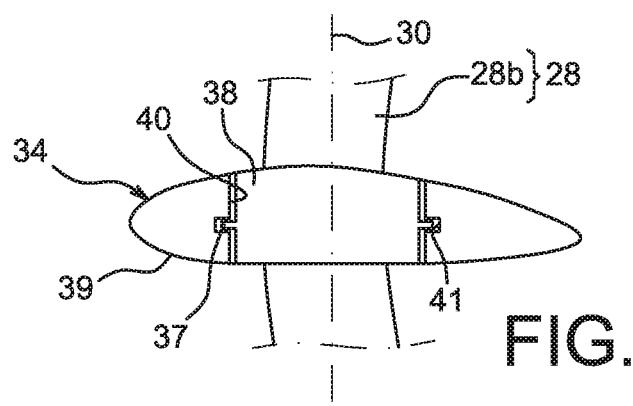
FIG. 8 is a view to a larger scale similar to that of FIG. 7 with the propeller conforming to a second preferred embodiment of the invention.
Figure 9:
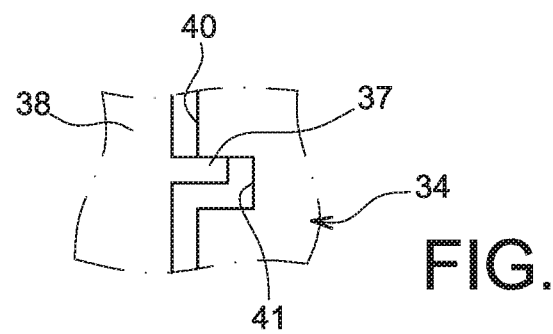
FIG. 9 represents a partial view to a larger scale of that of the preceding figure in a configuration such as it occupies after a blade fracture.

Referring to FIG. 7, the cooperation between the flange 37 and the intrados 39 of the retaining structure 34 is shown to a larger scale. Here the flange 37 is rigidly fastened to the aerodynamic portion 28, but could alternatively be fixed to a lower portion of the disk 38 passing through the orifice 40. In a second embodiment shown in FIGS. 8 and 9 the orifice 40 includes a groove 41 in which is housed a flange 37 projecting radially from the lateral surface of the connecting disk 38. Here there is also a small radial clearance in normal operation, which is taken up in the event of a blade fracture, as shown diagrammatically in FIG. 9.

Figure 10:
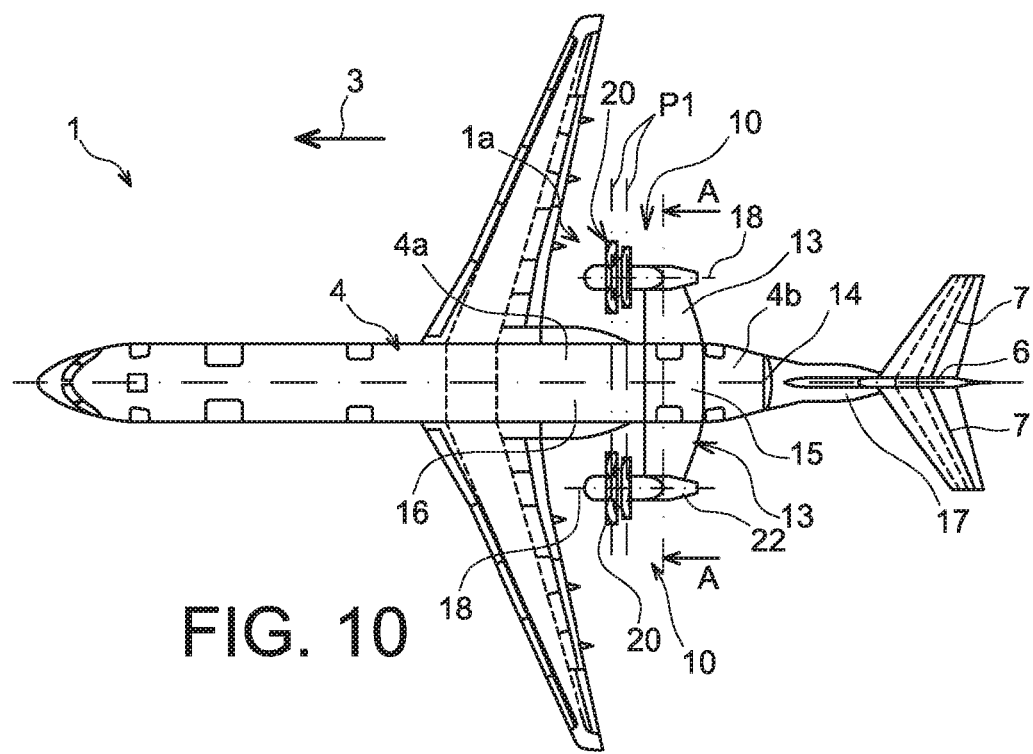
FIG. 10 represents a view similar to that of FIG. 1 with the propeller turbomachines arranged differently on the fuselage of the aircraft.
Figure 10A:
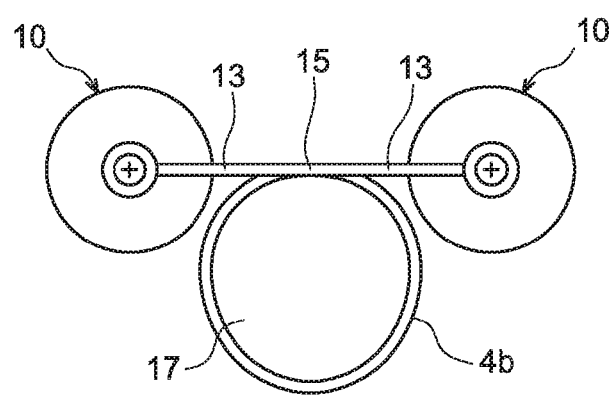
FIG. 10a is a view in section taken along the line A-A in FIG. 10.

Finally, in FIGS. 10 and 10a there is represented another configuration of the invention in which the propeller turbomachines 10 are arranged farther forward than in the previous configurations, still being disposed on respective opposite sides of the fuselage. Here the pylons 13 are assembled at the level of the portion 4a of the fuselage delimiting the passenger cabin 16 and no longer at the level of the portion 4b forming the tail cone of the aircraft. The pylons 13 are therefore arranged forward of the sealed bulkhead 14. Also, to prevent damaging the fuselage at the level of the pressurized compartment 16, the connecting beam 15 is assembled to the upper portion 4a of the fuselage delimiting the cabin.

In this configuration, the gas generator 22 for its part is also located forward of the sealed bulkhead 14, since any imaginary transverse plane A-A of this gas generator 22 passes through the portion 4a of the fuselage situated forward of the sealed bulkhead 14.

In this configuration of FIGS. 10 and 10a the design of the propellers 20 is identical or similar to that described above.

Whichever embodiment is envisaged, in addition to the principal advantages described above, the retaining structure confers the following additional advantages.

First of all, it is noted that in the event of a blade fracture the retention of the debris makes it possible to limit the level of vibrations after the fracture, because the resulting out of balance is lower. This makes it possible to increase the safety of the subsequent phase of rotation of the propeller without having to use heavy and costly means dedicated to the management of this vibration problematic, such as flexible attachments known as "soft engine mounts."

The retaining structure also limits the risks linked to impacts of ice that is liable to accumulate on the blades and slide along them. In effect, the ice is also retained radially by the structure specific to the invention.

This radial blade retention structure may also have the function of balancing the blades, for example, via adjustable sliding masses arranged on the trailing edge of this annular structure.

Of course, diverse modifications may be made by the person skilled in the art to the invention that has just been described by way of nonlimiting example only.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propeller for a turbomachine driven in rotation about a propeller rotation axis and including a plurality of variable pitch blades, each blade of the plurality of variable pitch blades comprising a root and an aerodynamic part, comprising:

a structure for radial retention of the variable pitch blades in the event that one of the variable pitch blades breaks, said retaining structure extending around the propeller rotation axis and spaced from the roots of the variable pitch blades such that the aerodynamic part of each blade of the propeller passes through said retaining structure, and each aerodynamic part equipped with an abutment, the retaining structure configured to retain the abutment in the event of a blade fracture causing a fracture in the aerodynamic part radially inside said abutment, wherein a radial clearance between each of the abutments of the variable pitch blades and the retaining structure when the blade is not broken.

2. The propeller according to claim 1, wherein the aerodynamic part of each blade is equipped with a connecting plate of circular shape, the axis of which coincides with a pitch axis of the blades, the retaining structure including at least one housing orifice rotatably housing the connecting plate of one of the blades of the propeller.

3. The propeller according to claim 2, wherein the connecting plate comprises a disk.

4. The propeller according to claim 1, wherein the retaining structure comprises a generally annular shape.

5. The propeller according to claim 4, wherein a cross section of the retaining structure comprises a shape of an aerodynamic profile.

6. The propeller according to claim 1, wherein the abutment is arranged facing a radially internal surface of the retaining structure.

7. An aircraft portion comprising:
a fuselage defining a pressurized compailinent, and
at least one turbomachine attached to the fuselage via an attachment pylon,
said turbomachine including at least one propeller comprising:
a plurality of blades, each blade comprising a root and an aerodynamic part,
a structure for radial retention of the blades in the event of one of the blades breaking,
said retaining structure extending around the propeller rotation axis and wherein the aerodynamic part of each blade extends through said retaining structure, and
each aerodynamic part comprising an abutment, the retaining structure configured to retain the abutment in the event of a blade fracture causing a fracture in the aerodynamic part radially inside said abutment,
said propeller arranged in an imaginary transverse plane passing through said pressurized compaitment,
said retaining structure located at a radial distance from the root between 0.4 and 0.7 times a total radial dimension of the aerodynamic portion.

8. The aircraft porting according to claim 7, wherein said pressurized compailinent comprises a passenger cabin.

9. The aircraft portion according to claim 7, wherein said turbomachine includes two contrarotating propellers each arranged in an imaginary transverse plane passing through said pressurized compailinent.

10. The aircraft portion according to claim 6, wherein said turbomachine is attached to an aft portion of the fuselage via the attachment pylon.

11. An aircraft comprising:
a fuselage defining a pressurized compailinent, and
at least one turbomachine attached to the fuselage via an attachment pylon, said turbomachine including at least one propeller comprising:
a plurality of variable pitch blades, each variable pitch blade comprising a root and an aerodynamic part,
a structure for radial retention of the blades in the event of one of the variable pitch blades breaking,
said retaining structure extending around the propeller rotation axis and wherein the aerodynamic part of each variable pitch blade passes through said retaining structure, and
each aerodynamic part equipped with an abutment, retaining structure configured to retain the abutment in the event of a variable pitch blade fracture causing a fracture in the aerodynamic part radially inside said abutment,
said propeller arranged in an imaginary transverse plane passing through said pressurized compartment.
said retaining structure located at a radial distance from the root between 0.4 and 0.7 times a total radial dimension of the aerodynamic portion.

* * * * *